(No Model.)

J. M. WHEAT.
BREAD OR CAKE BOX.

No. 517,085. Patented Mar. 27, 1894.

Witnesses:

Inventor
James M. Wheat
By James J. Shuhy
Attorney

UNITED STATES PATENT OFFICE.

JAMES M. WHEAT, OF ST. LOUIS, MISSOURI.

BREAD OR CAKE BOX.

SPECIFICATION forming part of Letters Patent No. 517,085, dated March 27, 1894.

Application filed August 25, 1893. Serial No. 484,080. (No model.)

*To all whom it may concern:*

Be it known that I, JAMES M. WHEAT, a citizen of the United States, residing at St. Louis, in the State of Missouri, have invented certain new and useful Improvements in Bread or Cake Boxes; and I do declare the following to be a full, clear, and exact description of the invention, such as will enable others skilled in the art to which it appertains to make and use the same.

My invention relates to improvements in bread and cake boxes; and it has for its general object to provide a box adapted to preserve bread, cake, pastry, and the like, in a moist and wholesome condition for an indefinite period of time.

With the foregoing ends in view, the invention will be fully understood from the following description and claims when taken in connection with the annexed drawings, in which—

Figure 1:
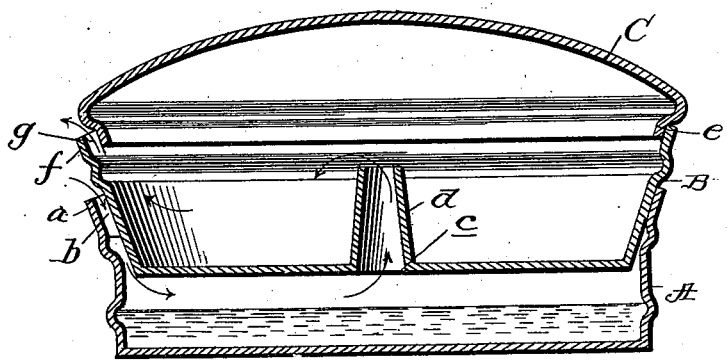
Figure 2:
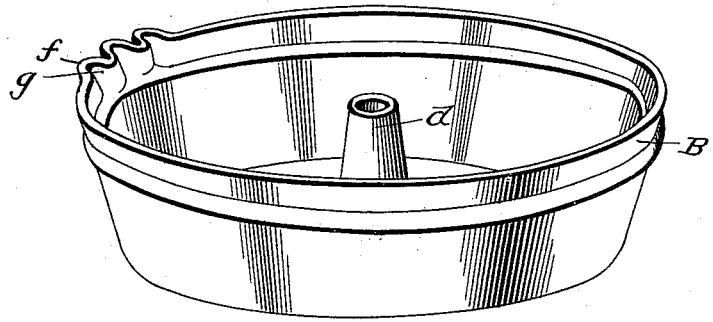
Figure 3:
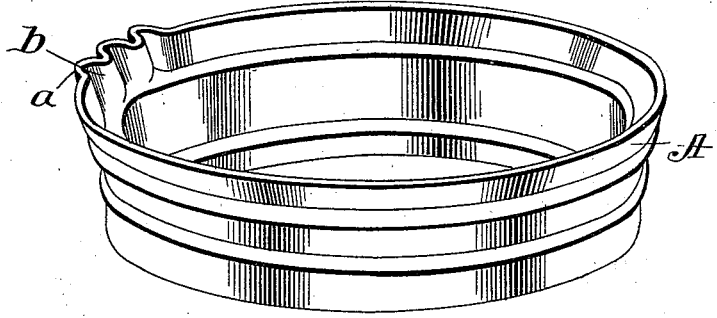

Figure 1, is a diametrical section of a box embodying my invention with the parts in their operative position. Fig. 2, is a perspective view of the receptacle designed to contain the bread or other substance to be preserved, and Fig. 3, is a similar view of the water vessel.

Referring by letter to said drawings: A, indicates the water vessel of my improved box, and B, indicates the receptacle for the bread, cake, or other substance to be preserved. The water vessel A, is preferably formed from metal and of the configuration shown, although it may be of any desired configuration, and it is provided in its side wall with one of more corrugations $a$, so as to afford an air passage or series of passages $b$, past the side wall of the receptacle B, which is placed in the vessel A, as shown in Fig. 1. The said receptacle B, is preferably of the same general form as the vessel A, and it is provided in its bottom, preferably at the center thereof, with an opening $c$, which communicates with the vessel A, and is surrounded by a vertically-disposed tube $d$, which is preferably of the proportional height illustrated. This tube $d$, serves to conduct the current of air from the vessel A, into the receptacle B, as shown by arrows in Fig. 1, and it also serves to prevent scraps and crumbs of bread, cake, and the like from falling into the vessel A.

C, indicates the cover of the receptacle B. This cover is provided with a depending flange $e$, which is designed to take within the side wall of the receptacle B, as illustrated; and in order to permit the air in the receptacle to escape past the flange $e$, so as to maintain a circulation of air through the receptacle, I provide the side wall of the said receptacle with a corrugation or series of corrugations $f$, so as to form air passages $g$.

In using my improved box, the vessel A, is supplied with water to about the height illustrated, and the bread, cake, or other substance is placed in the receptacle B, and the cover C, is placed in position. When this is done, it will be seen that a current of air will take through the passages $b$, and into the vessel A, where it will become laden with moisture, and will then pass up the tube $d$, and through the receptacle D, and will keep the bread or cake therein in a moist and wholesome condition.

It will be noticed from the foregoing description that my improved box is very cheap and simple; that it serves efficiently to keep the bread or cake moist and wholesome, and that it may be conveniently taken apart and cleansed when necessary.

While I have described the vessel A, and receptacle B, as provided with corrugations to afford passages for the induction and escape of air, I do not desire to be confined to such construction as any approved means may be employed for conducting air into the vessel A, and out of the vessel B, although the corrugations described are preferable.

Having described my invention, what I claim is—

1. A bread or cake box comprising a water vessel having a corrugation $a$, in its side wall, a receptacle arranged in the water vessel and communicating with the interior thereof and having a corrugation $f$, in its side wall; the said receptacle serving in conjunction with the corrugation $a$, of the vessel to form an induction passage $b$, leading from the outside of the box into the vessel, and a cover arranged upon the receptacle and serving in conjunction with the corrugation $f$, thereof to form an air eduction passage $g$, leading from the interior of the receptacle to the outside of the box, substantially as and for the purpose specified.

2. A bread or cake box comprising a water vessel having a corrugation $a$, in its side wall, a receptacle arranged in the water vessel and having an opening in its bottom and a tube surrounding said opening and also having a corrugation $f$, in its side wall; the said receptacle serving in conjunction with the corrugation $a$, of the vessel to form an air induction passage $b$, leading from the outside of the box into the vessel, and a cover arranged upon the receptacle and serving in conjunction with the corrugation $f$, thereof to form an air eduction passage $g$, leading from the interior of the receptacle to the outside of the box, substantially as and for the purpose set forth.

3. A bread and cake box comprising a receptacle having an air inlet passage, and also having a corrugation $f$, in its side wall, and a cover arranged on the said receptacle and serving in conjunction with the corrugation $f$, thereof to form an air eduction passage $g$, leading from the interior of the receptacle to the outside of the box, substantially as and for the purpose set forth.

In testimony whereof I affix my signature in presence of witnesses.

JAMES M. WHEAT.

Witnesses:
EDWARD S. JEFFREY,
ALF H. WHITE.